(12) United States Patent
Benczur-Uer-Moessy et al.

(10) Patent No.: US 6,887,621 B1
(45) Date of Patent: May 3, 2005

(54) ELECTRODE CAPABLE OF STORING HYDROGEN AND A METHOD FOR THE PRODUCTION OF THE SAME

(75) Inventors: Gabor Benczur-Uer-Moessy, Stuttgart (DE); Detlef Ohms, Holzminden (DE); Dagmar Nowak, Winnenden-Hanweiler (DE)

(73) Assignee: Deutsche Automobilgesellschaft mbH, Braunschweig (DE)

( * ) Notice: Subject to any disclaimer, the term of this patent is extended or adjusted under 35 U.S.C. 154(b) by 369 days.

(21) Appl. No.: 10/019,259

(22) PCT Filed: Jun. 10, 2000

(86) PCT No.: PCT/EP00/05376

§ 371 (c)(1),
(2), (4) Date: May 20, 2002

(87) PCT Pub. No.: WO01/01503

PCT Pub. Date: Jan. 4, 2001

(30) Foreign Application Priority Data

Jun. 29, 1999 (DE) .......................................... 199 29 949

(51) Int. Cl.[7] ............................................... H01M 4/58
(52) U.S. Cl. .................... 429/218.2; 429/217; 429/232; 429/233
(58) Field of Search .............................. 429/218.2, 217, 429/232, 233

(56) References Cited

U.S. PATENT DOCUMENTS

| 4,125,688 A | 11/1978 | Bonnaterre | |
|---|---|---|---|
| 5,496,665 A | * 3/1996 | Furukawa | 429/232 |
| 5,556,719 A | * 9/1996 | Hong et al. | 429/218.2 |
| 5,682,592 A | 10/1997 | Yun et al. | |

FOREIGN PATENT DOCUMENTS

| DE | 2727200 | 1/1978 |
|---|---|---|
| DE | 3702138 | 8/1988 |
| DE | 69415441 | 5/1999 |
| EP | 0277332 | 12/1987 |
| EP | 0735093 | 10/1996 |
| EP | 0641032 | 12/1998 |

OTHER PUBLICATIONS

"Manufacture of hydrogen–absorbing alloy anodes for alkaline secondary batteries" Chemical Abstracts, Aug. 1993.

Copy of German Office action dated Jan. 11, 2000.

Copy of the International Search Report.

* cited by examiner

Primary Examiner—Laura Weiner
(74) Attorney, Agent, or Firm—Crowell & Moring LLP

(57) ABSTRACT

An electrode and a method of manufacturing an electrode with a capacity to store hydrogen, has a metallic substrate material to which an active compound is applied. The active compound is obtainable from a paste which comprises a dry fraction and a liquid fraction. The dry fraction comprises a mixture of a pulverulent storage alloy for hydrogen, soot and polytetrafluoroethylene (PTFE), the particles of the storage alloy being covered with PTFE in the manner of fibrils; and the liquid fraction comprising a mixture of water and a higher alcohol which has from 3 to 6 C atoms.

19 Claims, 1 Drawing Sheet

ELECTRODE CAPABLE OF STORING HYDROGEN AND A METHOD FOR THE PRODUCTION OF THE SAME

BACKGROUND AND SUMMARY OF THE INVENTION

This application claims the priority of PCT International Application No. PCT/EP00/005376, filed 10 Jun. 2000 and German patent document 199 29 949.8, filed 29 Jun. 1999, the disclosure of which is expressly incorporated by reference herein.

The present invention relates to an electrode with a metallic substrate material to which an active compound is applied, and having a capacity to store hydrogen to a method for producing such an electrode.

An electrode of the generic type, described in German patent document DE 37 02 138 A1, includes an electrode which has a capacity to store hydrogen for carrying out electrochemical and chemical reactions. The electrode comprises a mixture of Raney nickel powder and the powder of at least one hydrogen storage alloy, the grains of which are covered with fibrillated polytetrafluoroethylene (PTFE). The Raney nickel and alloy grains are compressed by rolling or pressing in such a manner that they form a cohesive, electronically conductive body and are held together by the PTFE fibril network which is located in the interstices.

In an electrochemical cell, two pore systems which link up with one another are formed inside the electrode body of this electrode. One of these systems contains the electrolyte and comprises the packing gaps between the Raney nickel grains and the grains of the hydrogen storage alloy; the other is formed from the cohesive interstices of the Raney nickel grains and is not flooded by the electrolyte on account of the hydrophobic action of the PTFE. Therefore, this pore system contains hydrogen.

This document also mentions plastic-bonded hydrogen storage electrodes that are produced in a kneading process, for example, in accordance with German patent document DE-A 27 27 200, from the powder of a hydrogen storage alloy (for example the nickel-titanium or nickel-lanthanum system) and PTFE as a binder. A drawback of this arrangement is that, although efficient electrochemical charge storage is possible, it is associated with a deterioration in the power capacity or function (i.e., with a dragging gas conversion). This is presumably linked to the nonporous, hydrophobic nature of the electrode structure, so that the electrochemical exchange between electrolyte solution and the alloy phase no longer functions perfectly.

However, the Raney nickel component reduces the specific storage capacity of this known electrode compared to the plastic-bonded storage electrode again. Moreover, it is desirable to use electrodes with a particularly high specific storage capacity in storage batteries.

Therefore, one object of the present invention is to provide an electrode of the abovementioned type which has a particularly good specific storage capacity and a good power capacity.

Another object of the invention is to provide a method for producing an electrode of this type which is simple, rapid and inexpensive.

These and other objects and advantages are achieved by the electrode structure according to the invention, in which the active compound is obtainable from a paste composed of a dry fraction and a liquid fraction. As well as a hydrogen storage alloy and PTFE, the dry fraction also contains soot; the liquid fraction contains water and an alcohol which has 3–6 C atoms, the particles of the storage alloy being covered with PTFE in the manner of fibrils.

The addition of soot is important to make the mixture easier to process, as well as pasty and able to flow. In the electrode, the soot promotes the electrical contact on a microscale (up to approximately 500 $\mu$m); that is, it spans the distances and provides electrical contact between the openings or pores in the substrate material. These distances or openings, with a size of up to 500 $\mu$m, cannot be bridged by the particles in the paste or the active compound which can be obtained therefrom, since they generally have a diameter of only approximately 10 to 100 $\mu$m. Furthermore, the soot serves as an oxygen gate for protecting the oxygen-sensitive storage alloy. The PTFE is responsible for the hydrophobic properties of the electrode and enables the three-phase boundary to be set. The reduction of the oxygen and the release and uptake of the hydrogen in the working cell take place in the only partially wetted pores. The PTFE is also responsible for enabling the paste to flow and hold together in the mixing or shaping process. The alcohol is in turn responsible for the temporary wetting of the PTFE powder, since otherwise there would be no distribution through fibrillation in the mixing process.

In this way, the properties of the plastic-bonded storage electrodes (with their high specific storage capacity), and the properties of the electrodes (a mixture of storage alloy and Raney nickel powder) with their good power capacity or operation, are combined.

The method for producing the electrode according to the invention is very simple. The components are mixed in a mixer until a cohesive paste is formed. The paste is shaped and combined with the metallic substrate material (for example expanded metal, fabric, grid, perforated sheet) of the electrode. This is an extraordinarily simple process.

With the electrode according to the invention, it is no longer necessary, in conventional plastic-bonded storage electrodes, to use a PTFE dispersion with a high wetting agent content that has to be removed by decomposition at elevated temperature (300° C.), damaging the storage alloy.

According to further advantageous embodiments of the invention, the dry fraction contains 85–95 parts of the storage alloy, approximately 2–10 parts of soot and 3–8 parts of PTEE; and liquid fraction contains 30–70 parts by volume of water and 70–30 parts by volume of the alcohol. Alcohols with a boiling point of the order of magnitude of 100° C., i.e. for example n-butanol or n-propanol, are particularly suitable.

Furthermore, polyethylene glycol may be included in the liquid fraction. The PTFE component means that the finished electrode can be wetted by lye only with extreme difficulty. Therefore, to achieve a sufficient uptake of electrolyte, a polyethylene glycol can be supplied with the make-up water. The proportion of polyethylene glycol is 0.05–0.2% (based on the dry fraction). It is preferable to use a polyethylene glycol with a molecular weight of between 105 and $5\times10^6$ g/mol. The alcohol used is preferably n-propanol or n-butanol. Depending on the soot content, the ratio of the dry fraction to the liquid fraction is between 4:1 and 6:1, based on mass.

The electrode according to the invention is preferably used in an alkaline storage battery with positive nickel oxide electrode, such as shown in the FIGURE. It is produced by rolling a dough-like paste onto a structured metal substrate, such as for example an expanded metal or grid mesh. The dough-like paste is prefabricated in a first production step by a mixing and kneading process. The solid and liquid components are mixed in a kneading machine until a cohesive paste is formed, for example in a stable domestic kneading machine. The PTFE particles are fibrillated by the hard compound grains and hold the paste together. The electrode is shaped either by manual rolling or in a rolling train. Either a sheet is produced and is combined with the substrate after drying, or the kneaded compound is applied directly to the substrate and is then dried.

Other objects, advantages and novel features of the present invention will become apparent from the following detailed description of the invention when considered in conjunction with the accompanying drawings.

DETAILED DESCRIPTION OF THE INVENTION

Figure 1:
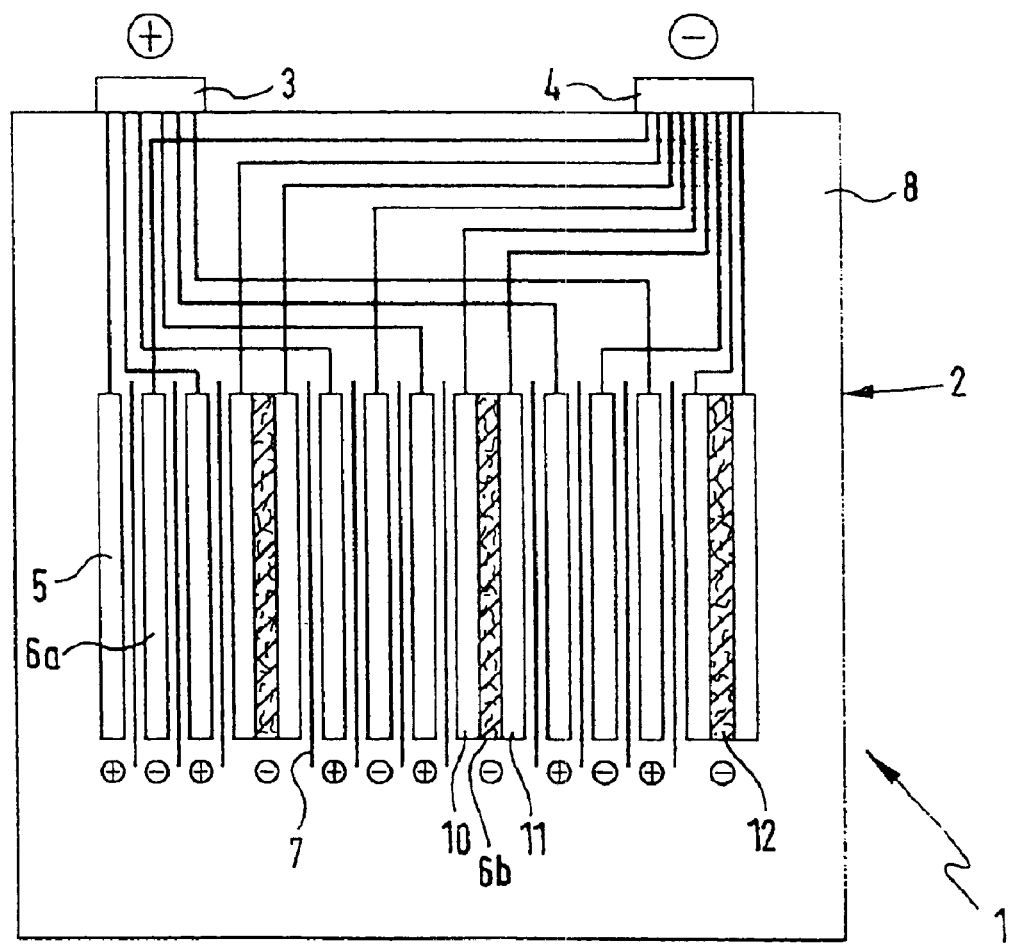
FIG. 1 shows an electrochemical storage unit with positive nickel oxide electrodes and including negative electrodes according to the invention.

The text which follows describes an exemplary embodiment of the present invention in more detail.

The following components were mixed together with water in order to produce a paste or pasty compound which can be rolled:

68% by mass of commercially available hydrogen storage alloy (lanthanum/misch-metal/nickel alloy with a grain size of less than 90 $\mu$m;

3.8% by mass of acetylene black (soot) (specific surface area 50–80 m$^2$/g);

3.8% by mass of PTFE powder (grain size less than 50 $\mu$m);

10.9% by mass of n-propanol.

High-molecular-weight polyethylene glycol (for example with a molecular weight of 5×10$^6$ g/mol) was dissolved in the added water in a concentration of 0.65% by mass.

This mixture was kneaded and mixed for 3 min in a domestic kneading machine. During this operation, the compound forms into a ball and can be fed to the rolling operation.

A sheet with a thickness of 1 mm was produced on a bench roller. This sheet web was dried in a vacuum drying cabinet at 100° C. The dried sheet web was applied to a substrate material (nickel mesh or expanded grid made from nickel or nickel-plated copper) by rolling (double roller with a nip setting of 0.4 mm).

The finished electrode had a final thickness of 0.5 mm. With an application of coating of 0.17 g/cm$^2$, the electrode, when operated as a hydrogen storage electrode in 6 M KOH, has a capacity of 43 mAh/cm$^2$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrode with capacity to store hydrogen, comprising:
    a metallic substrate material; and
    an active compound applied to the substrate material; wherein,
    the active compound is fabricated from a paste comprising a dry fraction and a liquid fraction;
    the dry fraction comprises a mixture of particles of hydrogen storage alloy, soot and polytetrafluoroethylene (PTFE);
    the particles of the hydrogen storage alloy are covered with PTFE in the manner of fibrils; and
    the liquid fraction comprising a mixture of water and a higher alcohol which has from 3 to 6 C atoms.

2. The electrode according to claim 1, wherein the dry fraction includes approximately 85 to 95 by mass parts of the storage alloy, 2 to 10 parts by mass of soot and 3 to 8 parts by mass of PTFE.

3. The electrode according to claim 1, wherein the liquid fraction contains 30 to 70 parts by volume of water and 70 to 30 parts by volume of the alcohol, and a suitable amount of polyethylene glycol (PEG) such that the resulting paste contains 0.05 to 0.2% of PEG by mass.

4. The electrode according to claim 1, wherein the liquid fraction also contains polyethylene glycol (PEG).

5. The electrode according to claim 4, wherein the PEG has a molecular weight of between 10$^5$ and 5×10$^6$ g/mol.

6. The electrode according to claim 1, wherein the liquid fraction contains n-propanol and/or n-butanol as alcohol.

7. The electrode according to claim 1, wherein the mass ratio of the dry fraction to the liquid fraction is 4:1 to 6:1.

8. A method for producing an electrode with capacity to store hydrogen, comprising:
    a metallic substrate material; and
    an active compound applied to the substrate material; wherein,
    the active compound is fabricated from a paste comprising a dry fraction and a liquid fraction;
    the dry fraction comprises a mixture of particles of hydrogen storage alloy, soot and polytetrafluoroethylene (PTFE);
    the particles of the storage alloy are covered with PTFE in the manner of fibrils; and
    the liquid fraction comprises a mixture of water and a higher alcohol which has from 3 to 6 C atoms, said method comprising:
    preparing a dry fraction comprising a mixture of particles of hydrogen storage alloy, soot and polytetrafluoroethylene (PTFE);
    preparing a liquid fraction comprising a mixture of water and a higher alcohol which has 3 to 6 C atoms;
    mixing the dry fraction and the liquid fraction in a kneading machine until a cohesive paste is formed;
    coating the resulting paste on the metallic substrate; and
    drying the paste.

9. The method according to claim 8, wherein the dry fraction comprises a mixture of approximately 85 to 95 parts by mass of the storage alloy, 2 to 10 parts by mass of soot and 3 to 8 parts by mass of PTFE.

10. The method according to claim 8, wherein the liquid fraction comprises a mixture of 30 to 70 parts by volume of water, 70 to 30 parts by volume of the alcohol, and a suitable amount of polyethylene glycol (PEG) such that the resulting paste contains 0.05 to 0.2% of PEG by mass.

11. The method according to claim 8, wherein the liquid fraction comprises a mixture which also contains polyethylene glycol (PEG).

12. The method according to claim 11, wherein the PEG has a molecular weight of between 10$^5$ and 5×10$^6$ g/mol.

13. The method according to claim 8, wherein the alcohol comprises one of n-propanol and n-butanol.

14. The method according to claim 8, wherein the dry fraction and the liquid fraction are mixed in a mass ratio of approximately 4:1 to 6:1.

15. The method as claimed claim 8, wherein:

the paste is compressed to form a sheet; and dried.

16. The method according to claim 15, wherein the sheet is combined with the substrate material by rolling.

17. The method according to claim 8, wherein:

the paste is applied directly to the substrate material; and dried.

18. The method according to claim 17, wherein the paste is applied to the substrate material by rolling.

19. A negative electrode in an alkaline storage battery with positive nickel oxide electrode, said electrode having a capacity to store hydrogen, and comprising:

a metallic substrate material; and an active compound applied to the substrate material; wherein, the active compound is fabricated from a paste comprising a dry fraction and a liquid fraction;

the dry fraction comprises a mixture of particles of hydrogen storage alloy, soot and polytetrafluoroethylene (PTFE);

the particles of the storage alloy are covered with PTFE in the manner of fibrils; and the liquid fraction comprising a mixture of water and a higher alcohol which has from 3 to 6 C atoms.

\* \* \* \* \*